United States Patent
Kosiak et al.

[11] Patent Number: 5,949,363
[45] Date of Patent: Sep. 7, 1999

[54] PIECEWISE LINEAR SIGNAL GENERATING CIRCUIT

[75] Inventors: Walter Kirk Kosiak, Kokomo; Mark Russell Keyse, Sharpsville, both of Ind.

[73] Assignee: Delco Electronics Corporation, Kokomo, Ind.

[21] Appl. No.: 08/796,000

[22] Filed: Feb. 5, 1997

[51] Int. Cl.[6] .................................................. G08C 19/12
[52] U.S. Cl. .......................... 341/173; 340/618; 327/100; 327/134
[58] Field of Search ........................... 341/173; 340/618; 327/100, 134, 170

[56] References Cited

U.S. PATENT DOCUMENTS

| | | | |
|---|---|---|---|
| 4,962,344 | 10/1990 | Bohrer | 327/134 |
| 5,357,147 | 10/1994 | Ina et al. | 327/100 |
| 5,687,067 | 11/1997 | Majid et al. | 363/97 |
| 5,717,350 | 2/1998 | Bohrer | 327/100 |

*Primary Examiner*—Michael Horabik
*Assistant Examiner*—Timothy Edwards, Jr.
*Attorney, Agent, or Firm*—Jimmy L. Funke

[57] ABSTRACT

A time-dependent piecewise linear signal generating circuit includes a first circuit responsive to a trigger signal to provide a number of time region signals each corresponding to a separate predefined time window of the piecewise linear signal, and a second circuit responsive to some of the time region signals to produce slope signals corresponding thereto, wherein each of the slope signals define a slope of the piecewise linear signal during a respective one of the time windows. A third circuit is responsive to the slope signals and the time region signals to produce the piecewise linear signal.

11 Claims, 4 Drawing Sheets

൧,൯൪൯,൩൬൩

PIECEWISE LINEAR SIGNAL GENERATING CIRCUIT

FIELD OF THE INVENTION

The present invention relates generally to circuitry for generating piecewise linear signal curves, and more specifically to such circuitry wherein each piecewise signal segment has a programmable slope and time duration.

BACKGROUND OF THE INVENTION

As a supplement to traditional automotive occupant restraint systems such as seat belts, various passive restraint systems have been developed in recent years. Such passive restraint systems are designed to improve the safety of motor vehicle occupants in the event of a sufficiently severe vehicle collision. A popular choice for such a passive restraint system involves the use of an inflatable air bag which, upon detection of a sufficiently severe collision, is typically operable to rapidly inflate one or more air bags toward and around a vehicle occupant.

Occupant injury resulting from a vehicle collision is based, to a large extent, upon a velocity change between the vehicle, which is rapidly decelerating as a result of impact with another mass, and the occupant, which may be considered to be a "free body" in that the occupant continues to move in the direction of travel at the pre-impact velocity. This velocity difference is therefore an important collision discrimination parameter, and many prior automotive air bag systems base deployment timing primarily on comparison of the vehicle velocity with a time-dependent velocity threshold or boundary.

The time-dependent nature of such an approach readily lends itself to well known digital programming techniques, and typical time-dependent and velocity based automotive air bag systems have therefore been designed to be microprocessor-controlled. In such systems, a microprocessor typically monitors vehicle acceleration, and begins execution of an air bag deployment algorithm when the vehicle exceeds a predetermined acceleration threshold value. From vehicle acceleration, the microprocessor calculates a vehicle velocity parameter and evaluates this velocity parameter against a microprocessor-generated velocity threshold curve. From this comparison, the microprocessor then determines whether the collision is of sufficient severity to deploy the air bag(s).

A typical microprocessor-generated velocity threshold curve used in such a system is a piece-wise linear function of velocity over the time period of interest. An example of one known velocity threshold curve 10 is shown in FIG. 1. Referring to FIG. 1, curve 10 consists of a four-breakpoint curve characterized by a minimum constant velocity 12, a maximum constant velocity 20 and three linearly varying velocities 14, 16 and 18 therebetween. The minimum constant velocity 12 is characterized by a minimum velocity value $V_{TH1}$ and the maximum constant velocity 20 is characterized by a maximum velocity value $V_{TH4}$. The three linearly varying velocities 14, 16 and 18 are each defined in terms of a slope, M, and intercept, B, and have minimum velocities of $V_{TH1}$, $V_{TH2}$ and $V_{TH3}$, respectively associated therewith. A key feature of the time-dependent velocity curve 10 is the ability to tailer the curve to have any number of breakpoints with any desired slope therebetween. This provides the programmer with flexibility to optimize system performance for various different vehicles and various different collision sensing orientations.

Referring to FIG. 2, one known microprocessor-executable software algorithm 50 for generating curve 10 is illustrated. Algorithm 50 begins at step 52, and at step 54, the time from enablement of the algorithm (TFE) is compared with the first breakpoint, $T_1$. If TFE is less than or equal to $T_1$, then algorithm execution continues at step 56 where the slope variable M is set equal to zero and the intercept value INT is set equal to $V_{TH1}$. If, at step 54, TFE is greater than $T_1$, algorithm execution continues at step 58 where TFE is compared with the second breakpoint, $T_2$. If TFE is less than or equal to $T_2$, then algorithm execution continues at step 60 where M is set equal to slope value $M_1$, and INT is set equal to intercept value $B_1$. Referring to FIG. 1, $M_1=(V_{TH2}-V_{TH1})/(T_2-T_1)$, and $B_1=V_{TH2}-M_1*T_2$.

If, at step 58, TFE is greater than $T_2$, algorithm execution continues at step 62 where TFE is compared with the third breakpoint, $T_3$. If TFE is less than or equal to $T_3$, then algorithm execution continues at step 64 where M is set equal to slope value $M_2$, and INT is set equal to intercept value $B_2$. Referring again to FIG. 1, $M_2=(V_{TH3}-V_{TH2})/(T_3-T_2)$, and $B_2=V_{TH3}-M_2*T_3$.

If, at step 62, TFE is greater than $T_3$, algorithm execution continues at step 66 where TFE is compared with the fourth breakpoint, $T_4$. If TFE is less than or equal to $T_4$, then algorithm execution continues at step 68 where M is set equal to slope value $M_3$, and INT is set equal to intercept value $B_3$. Referring once more to FIG. 1, $M_3=(V_{TH4}-V_{TH3})/(T_4-T_3)$, and $B_3=V_{TH4}-M_3*T_4$. If, at step 62, TFE is greater than $T_4$, M is set equal to zero and INT is set equal to $V_{TH4}$ at step 70.

From steps 56, 60, 64, 66, 68 and 70, algorithm execution continues at step 72 where the microprocessor computes the curve 10 in accordance with the equation Velocity=M*TFE+INT. From step 72, algorithm execution continues at step 74 where program control is returned to its calling routine.

While the foregoing time-dependent velocity threshold generating technique may be easily implemented in software, and is typically done so with a low-cost, general purpose microprocessor, this approach suffers from several inherent drawbacks. For example, low-cost general purpose microprocessors process data at a relatively slow rate, thereby limiting the number of breakpoints and slopes which may be used to construct velocity curve 10. Moreover, implementing a velocity threshold generating algorithm in software limits the rate at which an accelerometer signal can be sampled. This limitation leads to the possibility of missing important vehicle acceleration information which may be occurring at too rapid a rate for the digital system to decipher (i.e. "aliasing" problems). This leads to an unwanted phenomena known as sample point variation, wherein the sensing performance of the system varies depending upon the specific point in the collision where the sample is taken. Unfortunately, increasing the data sampling rate and/or processing speed results a drastic increase in microprocessor cost and system complexity.

As another example of an inherent drawback associated with the microprocessor implementation of a velocity threshold generating algorithm, even low-cost microprocessors consume a relatively large amount of real estate both in silicon area at the integrated circuit level and in circuit board area at the system level. The monetary as well as the space consumption costs may therefore be quite high when compared with an application specific integrated circuit which, by its nature, would be optimized for the specific task to be performed.

What is therefore needed is a circuit for generating time-dependent velocity threshold curves which does not rely on a microprocessor-based algorithm to generate the curves. Such a circuit would eliminate or minimize the aforementioned drawbacks of microprocessor-based air bag systems and would further permit the remainder of the collision sensing algorithm to be implemented in hardware, preferably with an application specific integrated circuit. Such a circuit should ideally be flexible enough to permit construction of a velocity threshold curve using any number of breakpoints and slopes, and should further be low cost in both material and manufacturing costs.

SUMMARY OF THE INVENTION

The foregoing shortcomings the prior art are addressed by the present invention. In accordance with one aspect of the present invention, a circuit for generating a piecewise linear signal comprises a first circuit responsive to a trigger signal to produce a number of time region signals each corresponding to a separate time region of the piecewise linear signal, a second circuit responsive to some of the number of time region signals to produce slope signals corresponding thereto, wherein each of the slope signals define a separate slope of the piecewise linear signal within a respective one of the time regions, and a third circuit responsive to the number of time region signals and the slope signals to produce the piecewise linear signal having the separate slopes within respective ones of the time regions.

In accordance with a second aspect of the present invention, an analog signal-based inflatable restraint control system includes an acceleration sensor for sensing acceleration and providing an analog acceleration signal corresponding thereto, an analog signal integrator responsive to the acceleration signal to provide an analog velocity signal, a signal comparison circuit having a first input receiving the analog velocity signal, a second input and an output providing an inflatable restraint control signal in accordance with signals received at the first and second inputs thereof, and a circuit for generating a predefined analog velocity threshold signal. The analog velocity threshold signal generating circuit comprises a first circuit providing a number of time region signals, wherein each of the time region signals correspond to a separate predefined time window of the analog velocity threshold signal, a second circuit responsive to some of the number of time region signals to produce slope signals corresponding thereto, wherein each of the slope signals define a slope of the analog velocity threshold signal during a respective one of the time windows, and a third circuit. The third circuit has an output connected to the second input of the signal comparison circuit and is responsive to the number of time region signals and the slope signals to produce the predefined analog velocity threshold signal at the third circuit output.

One object of the present invention is to provide a circuit producing a piecewise linear signal wherein each of the linear signal portions has a programmable slope and time duration.

Another object of the present invention is to provide such a circuit for producing a predefined analog velocity threshold signal as part of an analog signal-based inflatable restraint control system.

Yet another object of the present invention is to provide such a circuit, along with analog integration circuitry, signal comparison circuitry and the like, as a single integrated inflatable restraint control circuit.

These and other objects of the present invention will become more apparent from the following description of the preferred embodiment.

DESCRIPTION OF THE PREFERRED EMBODIMENT

Figure 1:
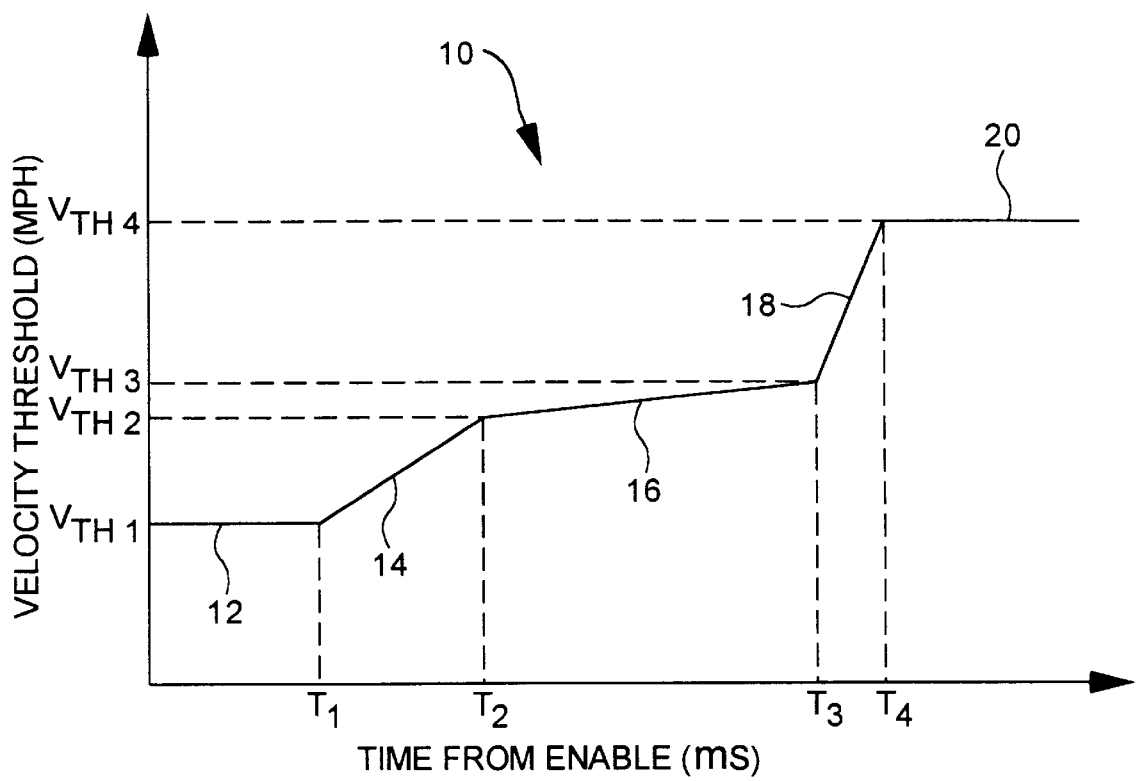
FIG. 1 is an example of a velocity threshold vs time waveform used in a prior art microprocessor-based inflatable restraint control system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
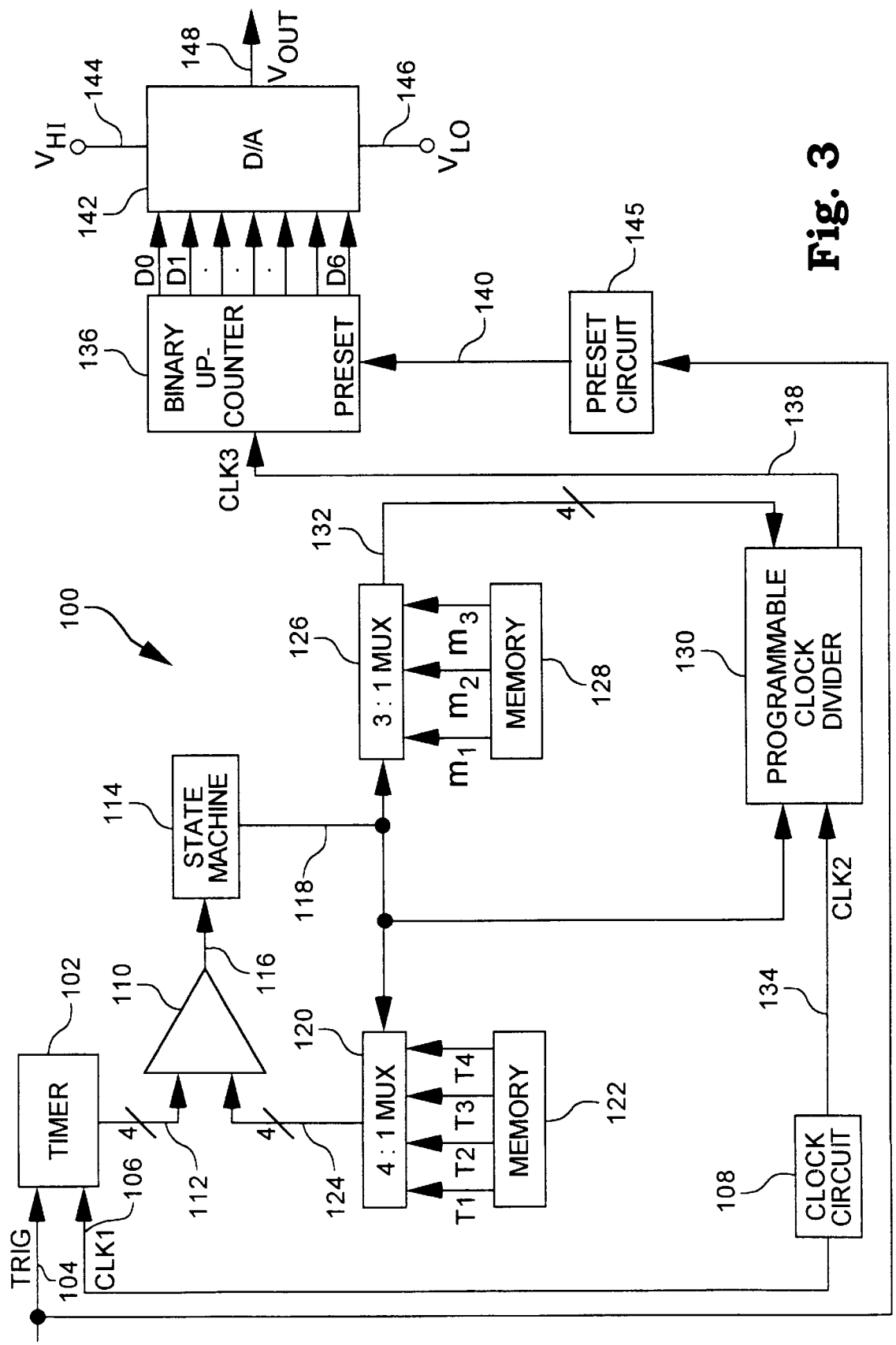
FIG. 3 is a diagrammatic illustration of one embodiment of a piecewise linear signal generating circuit in accordance with another aspect of the present invention, which circuit may be employed in the control system of FIG. 3.

Referring now to FIG. 3, one embodiment of a piecewise linear signal generating circuit 100, in accordance with the present invention, is shown. Circuit 100 includes a timer circuit 102 having a first input for receiving a trigger signal, TRIG, via signal path 104, and a second input for receiving a clock signal CLK1 from clock circuit 108, which may be of known construction, via signal path 106. One preferred source of TRIG will be described hereinafter with respect to FIG. 5. Timer circuit 102 may be of known construction, and is responsive to an active state of TRIG to provide g timing signals, at a rate of CLK1, on signal path 112, where g may be any integer value greater than 1. Preferably, g=4 so that the timing signal provided by timer circuit 102 on signal path 112 is a 4-bit timing signal. Signal path 112 is further connected to a first input of a comparator circuit 110, which must be correspondingly configured to receive g input signals (preferably four). Those skilled in the art will recognize that the active state of TRIG may be either logic high or logic low. In one preferred embodiment of circuit 100, timer circuit 102 is a 9-bit counter, although the present invention contemplates using higher or lower bit counter circuits in place thereof.

A time-keeping circuit 114 has an input connected to an output of comparator 110, which may be of known construction, via signal path 116, and an output connected to a timing input of a first multiplexing circuit 120, a timing input of a second multiplexing circuit 126, and a first input of a clock dividing circuit 130. Time-keeping circuit may be any known circuit operable to monitor signal path 116 for a number of changes of state of comparator 110, and provide a signal on signal path 118 corresponding thereto. In a preferred embodiment, timekeeping circuit 114 is a known state machine.

First multiplexing circuit 120 is a j:1 multiplexor, where j may be any integer value greater than 1, which may be of known construction and includes j data inputs connected to j data outputs of a first memory circuit 122, and an h signal output connected to a second h signal input of comparator circuit 110 via signal path 124, where h may be any integer value greater than 1. Preferably, h=4 so that first multiplexing circuit provides a 4-bit signal to the second input of comparator circuit 110 for comparison with the 4-bit signal provided to the first input thereof. First memory circuit 122 includes a corresponding number, j, of time values $T_1$–$T_j$ stored therein, and is configured to provide a separate one of the time values to a corresponding one of the data inputs of first multiplexing circuit 120. In a preferred embodiment of piecewise linear signal generating circuit 100, j=4 so that first multiplexing circuit 120 is a 4:1 multiplexor, and first memory circuit 122 includes four time values $T_1$–$T_4$ stored therein. Preferably, first memory circuit 122 is an EPROM of known construction, although the present invention contemplates that first memory circuit 122 may be any known memory circuit operable to store data therein such as, for example, RAM, ROM, EEPROM, Flash memory, or the like.

Second multiplexing circuit 126 is a k:1 multiplexor, where k is any integer value greater than 1, which may be of known construction and includes k data inputs connected to k data outputs of a second memory circuit 128, and a number, p, of outputs connected to a second input of clock dividing circuit 130 via signal path 132. Second memory circuit 128 includes a corresponding number, k, of slope rate values $M_1$–$M_k$ stored therein, and is configured to provide a separate one of the slope rate values to a corresponding one of the data inputs of second multiplexing circuit 126. In a preferred embodiment of piecewise linear signal generating circuit 100, k=3 and p=4 so that second multiplexing circuit 126 is a 3:1 multiplexor, second memory circuit 128 includes three slope rate values $M_1$–$M_3$ stored therein, and second multiplexing circuit 126 provides four signals to the second input of clock dividing circuit 130 via signal path 132. As with first memory circuit 120, second memory circuit 128 is preferably an EPROM of known construction, although the present invention contemplates that second memory circuit 128 may be any known memory circuit operable to store data therein such as, for example, RAM, ROM, EEPROM, Flash memory, or the like.

Clock dividing circuit 130 includes a third input connected to a second output of clock circuit 108 for receiving a clock signal CLK2 via signal path 134. Clock dividing circuit 130 may be of known construction, and is preferably a programmable clock dividing circuit responsive to the timing signal provided by time-keeping circuit 114 on signal path 118 to provide a clock signal, CLK3, on signal path 138 having a frequency equal to that of CLK2 divided by a slope rate value corresponding to the p signals provided on signal path 132.

Signal path 138 is connected to a clock input of a counter circuit 136 which has a PRESET input and a number, m, of counter outputs $D_0$–$D_{m-1}$ connected to a corresponding number of inputs of a digital-to-analog (D/A) converter circuit 142, where m may be any integer value greater than one. Counter circuit 136 is responsive to the CLK3 signal provided on signal path 138 to change a count value thereof each clock cycle of CLK3, and provide a count representation thereof at counter outputs $D_0$–$D_{m-1}$. A starting count value of counter circuit 136 may be set in accordance with an appropriate signal provided to the PRESET input by preset circuit 145, which may be of known construction, via signal path 140. Preferably, presetting of counter circuit 136 to its starting count value is triggered by the TRIG signal provided on signal path 104. Preferably, counter circuit 136 is a binary up-counter operable to increment the count value thereof each cycle of CLK3, although the present invention contemplates that counter circuit 136 may be a binary down-counter operable to decrement the count value thereof each cycle of CLK3, or any other known up or down counter (e.g. decimal, octal, hexadecimal, or the like). In a preferred embodiment of piecewise linear signal generation circuit 100, m=7 so that counter circuit 136 includes digital outputs $D_0$–$D_6$, and D/A converter 142 similarly includes seven digital inputs $D_0$–$D_6$ thereto.

D/A converter 142 further includes a high voltage reference input 144 for receiving an upper voltage limit signal $V_{HI}$ thereat, and a low voltage reference input 146 for receiving a lower voltage limit signal $V_{LO}$ thereat as is known in the art. A piecewise linear analog signal, provided in accordance with the signal generating circuit 100 of the present invention, is provided at output $V_{OUT}$ 148 of D/A converter. In general, between any of the discrete time periods $T_{n-1}$ to $T_n$ having a corresponding slope rate value $M_n$, the voltage $V_{OUT}$ provided by D/A converter on signal path 148 is a linearly increasing analog voltage given by the equation:

$$V_{OUT}=V_{PREVIOUS}+[(T_n-T_{n-1})*(D/A \text{ resolution})/(CLK2*M_n)] \quad (1),$$

where $V_{PREVIOUS}$ is $V_{OUT}$ of the previous discrete time period and D/A resolution corresponds to the amount of analog voltage change at $V_{OUT}$ for every count of counter circuit 136.

With reference to the piecewise linear voltage signal 150 of FIG. 4, which corresponds to the signal $V_{OUT}$ of FIG. 3, an example of the operation of one preferred embodiment of the piecewise linear signal generating circuit 100 will now be described in detail. Preferably, timer circuit 102 is a 9-bit counter and CLK1 has a period of 100 microseconds, thereby providing a maximum timer period of 51.2 milliseconds. Timer circuit 102 is responsive to an active state of TRIG to enable operation of circuit 100 by providing a 4-bit count signal, a the rate of CLK1, on signal path 112. The transition of TRIG to an active state corresponds to TIME=0 in FIG. 4. Initially, state machine 114 provides a low signal on signal path 118 so that multiplexor 120 provides the 4-bit time value $T_1$ on signal path 124 and programmable clock divider 130 is not enabled. Preferably, $V_{LO}(146)$ is set at 1.5 volts and $V_{HI}$ (144) is set at 4.5 volts, and a suitable voltage is provided at the PRESET input (140) of binary up-counter 136 so that the initial count thereof is set at zero. Alternatively, $V_{LO}$ (146) can be set at ground potential, and a suitable voltage can be provided ground potential, and a suitable voltage can be provided at the PRESET input (140) of binary up-counter 136 so that the initial count thereof is set such that $V_{OUT}$ is initially 1.5 volts. In either case, $V_{OUT}$ remains at 1.5 volts until the first breakpoint is reached as shown by line segment 152 of FIG. 4.

Figure 4:
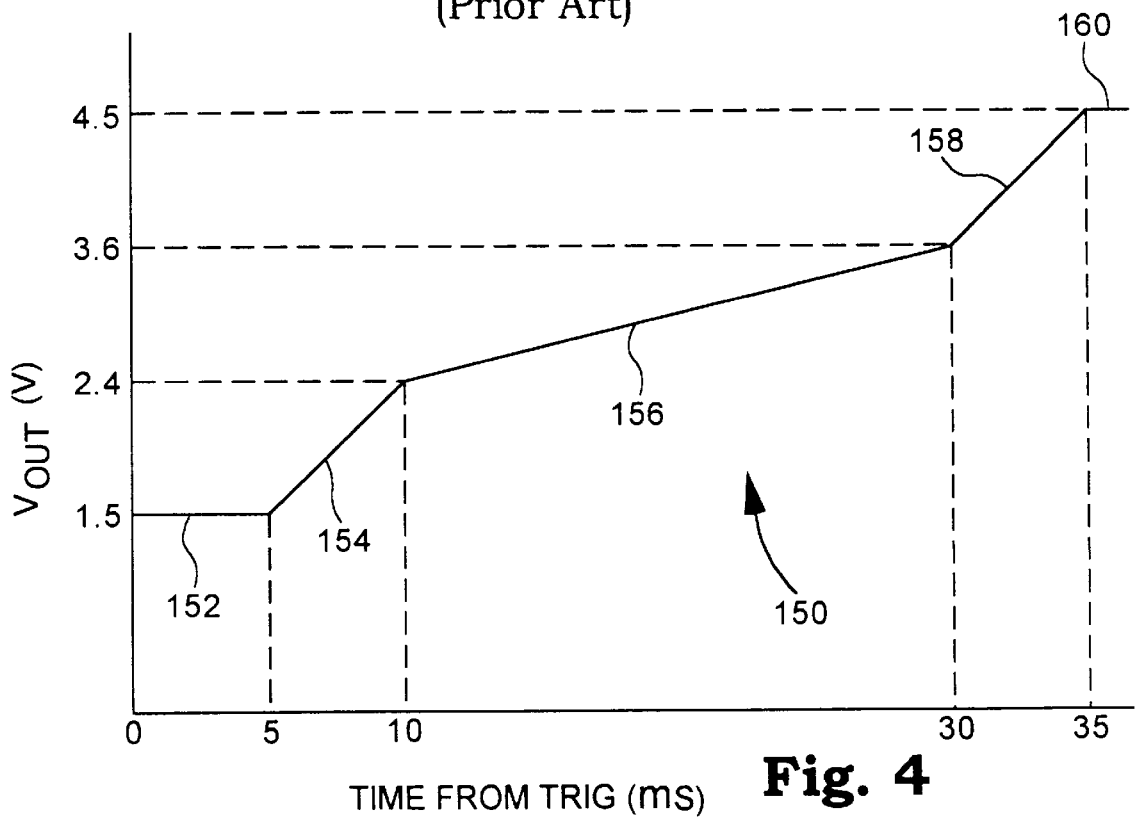
FIG. 4 is a example piecewise linear voltage signal produced by the circuit of FIG. 3.
Figure 2:
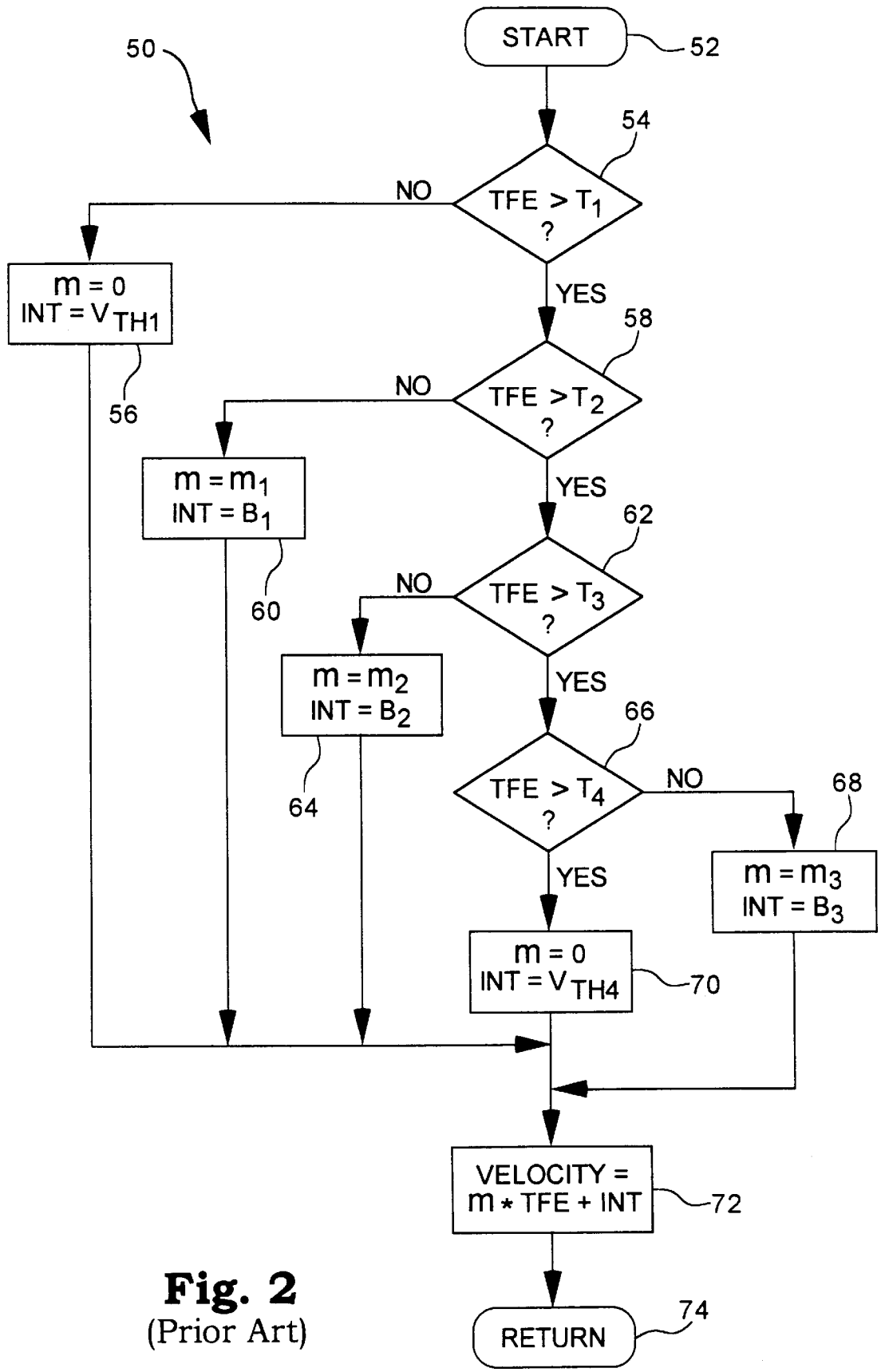
FIG. 2 is a flowchart illustrating one known microprocessor executable algorithm for generating the waveform of FIG. 1.

When timer 102 reaches a count value equal to $T_1$, which in the example of FIG. 4 is set at 5 milliseconds, comparator circuit 110 changes state and state machine 114 responds thereto by providing a first signal on signal path 118 indicative of a first change of state of comparator circuit 110. Multiplexor circuit 120 is responsive to the first signal on signal path 118 to provide the 4-bit time value $T_2$ on signal path 124, which causes comparator circuit 110 to switch back to its previous state. Programmable clock divider 130 is responsive to the first signal on signal path 118 to provide clock signal CLK3 on signal path 138 in accordance with slope rate data provided thereto by second multiplexing circuit 126. Preferably, CLK2, provided by clock circuit 108 has a period of approximately 32 microseconds.

Multiplexor circuit 126 is responsive to the first signal on signal path 118 to provide a slope rate value, corresponding to the slope of line segment 154, to programmable clock divider 130 via signal path 132. Preferably, the signal provided by multiplexor 126 on signal path 132 is a 4-bit binary slope value so that the frequency of the base clock (CLK2) of programmable clock divider 130 may be divided by any value between 1 and 16. In the example shown in FIG. 4, the binary slope value of line segment 154 ($M_1$) is set at 4 so that CLK3 has a period of 32*4=128 microseconds, and binary up-counter 136 thus operates at a rate of 128 microseconds/count. Since $V_{HI}$=4.5 volts, and $V_{LO}$=1.5 volts, and the binary up-counter 136 is a 7-bit counter (for a total of 128 counts), D/A converter 142 has a resolution of approximately (4.5−1.5)/128=23.4 millivolts/count. Thus, between $T_1$=5 milliseconds and $T_2$=10 milliseconds, $V_{OUT}$ linearly increases, in accordance with equation 1, from $V_{OUT}$=$V_{LO}$=1.5 volts to approximately $V_{OUT}$=2.4 volts, as shown by line segment 154.

When timer 102 reaches a count value equal to $T_2$, which in the example of FIG. 4 is set at 10 milliseconds, comparator circuit 110 again changes state and state machine 114 responds thereto by providing a second signal on signal path 118 indicative of a second change of state of comparator circuit 110. Multiplexor circuit 120 is responsive to the second signal on signal path 118 to provide the 4-bit time value $T_3$ on signal path 124, which then causes comparator circuit 110 to switch back to its previous state. Programmable clock divider 130 is responsive to the second signal on signal path 118 to provide clock signal CLK3 on signal path 138 in accordance with new slope rate data provided thereto by second multiplexing circuit 126.

Multiplexor circuit 126 is responsive to the second signal on signal path 118 to provide a slope rate value, corresponding to the slope of line segment 156, to programmable clock divider 130 via signal path 132. In the example shown in FIG. 4, the binary slope value of line segment 156 ($M_2$) is set at 12 so that CLK3 has a period of 32*12 =384 microseconds, and binary up-counter 136 thus operates at a rate of 384 microseconds/count. Thus, between $T_2$=10 milliseconds and $T_3$=30 milliseconds, $V_{OUT}$ linearly increases, in accordance with equation 1, from $V_{OUT}$=2.4 volts to approximately $V_{OUT}$=3.6 volts, as shown by line segment 156.

As timer 102 continues to count and reaches a count value equal to $T_3$, which in the example of FIG. 4 is set at 30 milliseconds, comparator circuit 110 again changes state and state machine 114 responds thereto by providing a third signal on signal path 118 indicative of a third change of state of comparator circuit 110. Multiplexor circuit 120 is responsive to the third signal on signal path 118 to provide the 4-bit time value $T_4$ on signal path 124, which then causes comparator circuit 110 to switch back to its previous state. Programmable clock divider 130 is responsive to the third signal on signal path 118 to provide clock signal CLK3 on signal path 138 in accordance with new slope rate data provided thereto by second multiplexing circuit 126.

Multiplexor circuit 126 is responsive to the third signal on signal path 118 to provide a slope rate value, corresponding to the slope of line segment 158, to programmable clock divider 130 via signal path 132. In the example shown in FIG. 4, the binary slope value of line segment 158 ($M_3$) is set at 4 so that CLK3 has a period of 32*4=128 microseconds, and binary up-counter 136 thus operates at a rate of 128 microseconds/count. Thus, between $T_3$=30 milliseconds and $T_4$=35 milliseconds, $V_{OUT}$ linearly increases, in accordance with equation 1, from $V_{OUT}$=3.6 volts to approximately $V_{OUT}$=4.5 volts, as shown by line segment 158.

As timer circuit 102 continues to count and reaches a count value equal to $T_4$, which in the example of FIG. 4 is set at 35 milliseconds, comparator circuit 110 again changes state and state machine 114 responds thereto by providing a fourth signal on signal path 118 indicative of a fourth change of state of comparator circuit 110. Multiplexor circuits 120 and 126 are both unresponsive to the fourth signal on signal path 118, and the programmable clock divider circuit 130 is simply operable to provide clock signal CLK3 as a replica of CLK2. However, since binary up-counter 136 has reached its maximum count, D/A converter 142 holds $V_{OUT}$=$V_{HI}$, as shown by line segment 160, until circuit 100 is reset by a new TRIG signal, which is preferably further operable to provide reset the PRESET voltage to its initial value, thereby setting $V_{OUT}$=$V_{LO}$.

From the foregoing, it should now be appreciated that piecewise linear signal generating circuit 100 provides a circuit for generating time-dependent velocity threshold curves which does not rely on a microprocessor-based algorithm to generate the curves. Circuit 100 includes the flexibility provided by prior art microprocessor-based circuits by providing for the ability to tailor the boundary curve in order to optimize the collision sensing performance of an automotive air bag system for different vehicles and for different sensor orientations. In particular, the time region parameters $T_1$–$T_j$ and slope rate parameters $M_1$–$M_k$ are preferably stored in programmable memory to permit modification of the characteristics of the time-dependent velocity threshold based on vehicle collision dynamics. The present invention further contemplates providing the initial and final velocity threshold voltages $V_{LO}$ and $V_{HI}$ as programmable quantities for increased system flexibility. Moreover, while circuit 100 of the present invention has been described with the aid of an example having four breakpoints, those skilled in the art will recognize that more complex velocity boundary curves could easily be developed utilizing the concepts described herein by including further time region and slope rate decodes.

Because the time-dependent velocity threshold curve generating circuit 100 of the present invention is implemented in digital and analog hardware, and preferably in integrated circuit form, the remainder of the collision sensing algorithm may similarly be implemented in hardware, thereby eliminating the need for microprocessor control over the automotive air bag system. An example of one such automotive air bag system 200 is shown in FIG. 5.

Figure 5:
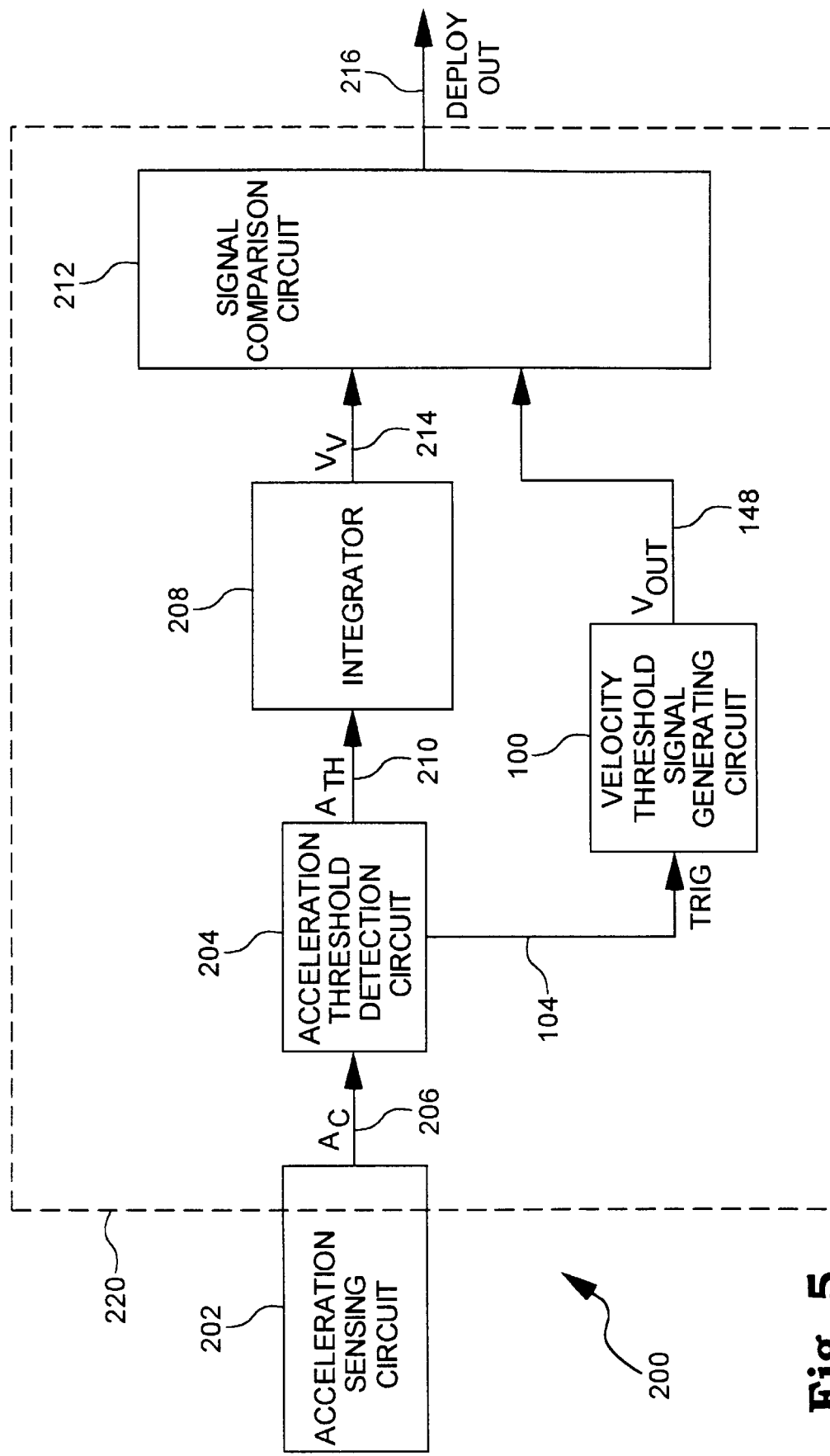
FIG. 5 is a diagrammatic illustration of one embodiment of an analog signal-based inflatable restraint control system in accordance with one aspect of the present invention.

Referring to FIG. 5, system 200 includes an acceleration sensing circuit 202, which may include an accelerometer and associated signal compensation circuitry, connected to an acceleration threshold detection circuit 204 via signal path 204. Circuit 204 is connected to an integrator circuit 208 via signal path 210 which is, in turn, connected to signal comparison circuit via signal path 214. Acceleration threshold detection circuit 204 is also connected to the velocity threshold signal generating circuit 100 of the present invention via signal path 104 which is, in turn, connected to signal comparison circuit 212 via signal path 214. Signal comparison circuit 212 provides a DEPLOY OUT signal on signal path 216 which may be used to control air bag deployment drivers and/or solenoids as is known in the art. The present invention contemplates that circuits 202, 204, 208 and 212 may be of known construction, and that at least the acceleration signal conditioning circuitry of acceleration sensing circuit 202, along with circuits 100, 204, 208 and 212, may be provided as a single application specific integrated circuit 220.

In operation, acceleration sensing circuit 202 provides a conditioned analog acceleration signal $A_C$ to acceleration threshold detection circuit 204 as is known in the art. Circuit 204 is operable to monitor analog signal $A_C$ and provide the TRIG signal to velocity threshold signal generating circuit 100 via signal path 104, as discussed hereinabove, when the analog signal $A_C$ exceeds a predefined acceleration level. In addition to providing the TRIG signal to circuit 100, accleration threshold detection circuit 204 is operable to pass the acceleration signal $A_C$, as analog acceleration signal $A_{TH}$, to the integrator circuit 208 when $A_C$ exceeds the predefined acceleration threshold. The integrator circuit 208 is operable, as is known in the art, to integrate the analog $A_{TH}$ signal and provide an analog vehicle velocity signal $V_V$ corresponding thereto. Signal comparison circuit 212 is then operable to compare $V_V$ with $V_{OUT}$ provided by circuit 100 of the present invention, and provide an active DEPLOY OUT signal in accordance with predefined comparison conditions.

The present invention is illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The embodiments of the invention in which an exclusive property or privilege is claimed are defined as follows:

1. A circuit for generating a piecewise linear signal comprising:

a first circuit including a first memory circuit storing a plurality of time values therein, each of said plurality of time values defining a time boundary of a number of adjacent time regions, and a time-keeping circuit responsive to said plurality of time values and to a trigger signal to produce a number of time region signals each corresponding to a separate time region of the piecewise linear signal;

a second circuit responsive to some of said number of time region signals to produce slope signals corresponding thereto, each of said slope signals defining a separate slope of the piecewise linear signal within a respective one of said time regions; and a third circuit responsive to said number of time region signals and said slope signals to produce the piecewise linear signal having said separate slopes within respective ones of said time regions.

2. The circuit of claim 1 wherein said third circuit includes a lower signal threshold, said third circuit responsive to said trigger signal to provide the piecewise linear signal as said lower threshold signal during a first one of said time regions following said trigger signal.

3. The circuit of claim 1 further including a clock circuit producing a first clock signal, said third circuit responsive to said first clock signal to produce the piecewise linear signal.

4. The circuit of claim 3 wherein said clock circuit further produces a second clock signal, said first circuit further responsive to said second clock signal to produce said number of time region signals.

5. The circuit of claim 4 wherein said time-keeping circuit includes:

a comparator having a first input receiving said second clock signal, a second input receiving said plurality of time values and an output; and a state machine having an input connected to said comparator output and an output providing said number of time region signals.

6. The circuit of claim 5 further including a multiplexing circuit having a plurality of first inputs each receiving respective ones of said plurality of time values, a second input receiving said number of time region signals and an output connected to said second comparator input.

7. The circuit of claim 4 wherein said second circuit includes:

a second memory circuit storing a plurality of slope values therein; and a multiplexing circuit having a plurality of first inputs each receiving respective ones of said plurality of slope values, a second input receiving said number of time region signals and an output providing said slope signals.

8. The circuit of claim 4 wherein said third circuit includes:

a clock dividing circuit having a firs input receiving said first clock signal and a second input receiving said slope signals, said clock dividing circuit dividing the frequency of said first clock signal by ones of said slope signals associated with respective ones of said number of time regions to provide a third clock signal having a predefined clock rate during each of said respective ones of said number of time regions; and a counter circuit responsive to said third clock signal to produce the piecewise linear signal.

9. The circuit of claim 8 wherein said counter circuit includes:

an up-counter having a first input receiving said third clock signal and a plurality of parallel outputs, said up-counter responsive to clock cycles of said third clock signal to provide an incremented count value in accordance therewith at said plurality of parallel outputs; and a digital-to-analog (D/A) converter having a plurality of parallel inputs connected to corresponding ones of said plurality of parallel outputs of said up-counter and an analog output, said D/A converter responsive to count values at said plurality of parallel inputs to provide the piecewise linear signal at said analog output.

10. The circuit of claim 9 wherein said up-counter includes a second input receiving a preset signal, said up-counter providing an initial count value at said plurality of parallel outputs thereof corresponding to said preset signal.

11. The circuit of claim 9 wherein said D/A converter includes a low reference voltage input receiving a first voltage level thereat and a high reference voltage input receiving a second voltage level thereat, said D/A converter producing the piecewise linear signal having signal values between said first and second voltage levels.

* * * * *